(12) United States Patent
Guo et al.

(10) Patent No.: US 10,859,099 B2
(45) Date of Patent: Dec. 8, 2020

(54) HOUSING FOR BOX FAN, BOX FAN AND ASSEMBLY METHOD THEREOF

(71) Applicants: GD MIDEA ENVIRONMENT APPLIANCES MFG CO., LTD., Zhongshan (CN); MIDEA GROUP CO., LTD., Foshan (CN)

(72) Inventors: Runming Guo, Zhongshan (CN); Weiliang Liu, Zhongshan (CN); Fengxi Yan, Zhongshan (CN); Xusheng Zhang, Zhongshan (CN); Meihua Deng, Zhongshan (CN)

(*) Notice: Subject to any disclaimer, the term of this patent is extended or adjusted under 35 U.S.C. 154(b) by 223 days.

(21) Appl. No.: 15/748,582

(22) PCT Filed: Dec. 14, 2015

(86) PCT No.: PCT/CN2015/097255
§ 371 (c)(1),
(2) Date: Jan. 29, 2018

(87) PCT Pub. No.: WO2017/054322
PCT Pub. Date: Apr. 6, 2017

(65) Prior Publication Data
US 2018/0231024 A1  Aug. 16, 2018

(30) Foreign Application Priority Data

Sep. 30, 2015 (CN) .................. 2015 2 0775336 U
Dec. 9, 2015 (CN) .................. 2015 1 0903947
Dec. 9, 2015 (CN) .................. 2015 2 1016301 U

(51) Int. Cl.
*F04D 29/64* (2006.01)
*F04D 25/08* (2006.01)
(Continued)

(52) U.S. Cl.
CPC .......... *F04D 29/644* (2013.01); *F04D 25/06* (2013.01); *F04D 25/08* (2013.01); *F04D 29/522* (2013.01);
(Continued)

(58) Field of Classification Search
CPC ...... F04D 29/644; F04D 29/646; F04D 25/06; F04D 25/08; F04D 29/522; F04D 29/526;
(Continued)

(56) References Cited

U.S. PATENT DOCUMENTS 5,803,709 A * 9/1998 Matthews ............. F04D 29/545
415/182.1
6,958,909 B2  10/2005 Endo et al.
(Continued)

FOREIGN PATENT DOCUMENTS

CN  201027709 Y  *  2/2008
CN  201027709 Y      2/2008
CN  201103571 Y      8/2008

*Primary Examiner* — J. Todd Newton
*Assistant Examiner* — Sabbir Hasan
(74) *Attorney, Agent, or Firm* — Kilpatrick Townsend & Stockton, LLP

(57) ABSTRACT

A housing (100) for a box fan (1), the box fan (1) and an assembly method therefor are provided. The box fan (1) includes a housing (100) and a fan blade. The housing (100) includes two shields (111, 112) and a frame. The two shields (111, 112) are arranged opposite to and spaced apart from each other. The frame is arranged between the two shields (111, 112). The frame and the two shields (111, 112) are joined and mounted through their own structures respectively, and at least one of the shields can be attached to or detached from the frame by pushing or pulling. The fan blade is rotatably installed in the housing (100). The box fan is easy to assemble and low in cost.

11 Claims, 17 Drawing Sheets

(51) Int. Cl.
  *F04D 29/52* (2006.01)
  *F04D 25/06* (2006.01)
  *F04D 29/70* (2006.01)
  *H02K 5/136* (2006.01)
  *F04D 19/00* (2006.01)

(52) U.S. Cl.
  CPC ......... *F04D 29/526* (2013.01); *F04D 29/646* (2013.01); *F04D 29/703* (2013.01); *H02K 5/136* (2013.01); *F04D 19/002* (2013.01)

(58) Field of Classification Search
  CPC ....... F04D 29/703; F04D 19/002; H02K 5/04; H02K 5/136
  See application file for complete search history.

(56) References Cited

U.S. PATENT DOCUMENTS

| | | | |
|---|---|---|---|
| 7,224,584 B2 | 5/2007 | Lin | |
| 2009/0269186 A1* | 10/2009 | Miller | F04D 29/646 415/121.2 |

* cited by examiner

HOUSING FOR BOX FAN, BOX FAN AND ASSEMBLY METHOD THEREOF

CROSS-REFERENCE TO RELATED APPLICATION

This application is a national phase entry under 35 USC § 371 of International Application PCT/CN2015/097255, filed Dec. 14, 2015, which claims priority to and benefits of Chinese Patent Applications Serial No. 201520775336.5, filed with the State Intellectual Property Office of P. R. China on Sep. 30, 2015, and Chinese Patent Applications Serial No. 201510903947.8 and 201521016301.X, filed with the State Intellectual Property Office of P. R. China on Dec. 9, 2015, the entire contents of which are incorporated herein by reference.

FIELD

The present disclosure relates to a technical field of household appliances, and more particularly to a box fan, a housing for the box fan and an assembly method for the box fan.

BACKGROUND

In the related art, a frame of a box fan is formed of metal lateral plates by means of welding. This assembly way has a complex machining process and low manufacturability, and needs a large number of screws to fix a front shield, thereby resulting in increase of parts in number, reducing production efficiency and increasing cost.

SUMMARY

Embodiments of the present disclosure seek to solve at least one of the problems existing in the related art to at least some extent. For that reason, the present disclosure provides a box fan, and the box fan has easy assembly and low cost.

The box fan according to embodiments of the present disclosure, includes a housing, the housing including two shields and a frame, the two shields being opposite to and spaced from each other, the frame being arranged between the two shields, the frame and the two shields are joined and mounted through their own structures, and at least one of the shields being pushably and pullably mounted and dismounted relative to the frame; and a fan blade rotatably arranged in the housing.

The box fan according to embodiments of the present disclosure has an assembly process of the housing is simplified, assembly efficiency of the housing is improved, the number of parts for the assembly of the housing is decreased, and the production cost is lowered.

According to some embodiments of the present disclosure, each of the two shields and the frame is a plastic part.

According to some embodiments of the present disclosure, at least one of the shields is fitted with the frame through snap connection and/or insertion connection.

According to some embodiments of the present disclosure, the frame includes a plurality of lateral plates which are joined and mounted head to tail sequentially.

According to some embodiments of the present disclosure, two adjacent lateral plates are fitted with each other through snap connection and/or insertion connection.

According to some embodiments of the present disclosure, the two shields are a first shield and a second shield opposite to each other, each of the first shield and the second shield is configured as a rectangle, the frame includes a first lateral plate, a second lateral plate, a third lateral plate and a fourth lateral plate which are connected together head to tail sequentially by snap connection, the first lateral plate and the third lateral plate are arranged opposite to each other and fitted with two opposite edges of the first shield respectively, the second lateral plate and the fourth lateral plate are arranged opposite to each other and fitted with the other two opposite edges of the first shield respectively, the second shield is pushable and pullable relative to the frame and is fitted with the first lateral plate, the second lateral plate and the third lateral plate.

According to some embodiments of the present disclosure, each of the first lateral plate, the second lateral plate, the third lateral plate and the fourth lateral plate defines a limiting groove, each of four edges of the first shield is limited in the limiting groove through insertion connection.

According to some embodiments of the present disclosure, the limiting groove in each of the first lateral plate and the third lateral plate is a wedge-shaped groove, the wedge-shaped groove has a width increasing gradually in a direction from the second lateral plate to the fourth lateral plate.

According to some embodiments of the present disclosure, two adjacent lateral plates among the first lateral plate, the second lateral plate, the third lateral plate and the fourth lateral plate are limited through insertion connection between an insertion and an insertion groove.

According to some embodiments of the present disclosure, each of the first lateral plate, the second lateral plate and the third lateral plate defines a push-pull groove, and the second shield is pushably and pullably fitted with the push-pull groove.

According to some embodiments of the present disclosure, the push-pull groove in each of the first lateral plate and the third lateral plate is a wedge-shaped groove, the wedge-shaped groove has a width increasing gradually in the direction from the second lateral plate to the fourth lateral plate.

According to some embodiments of the present disclosure, a lateral surface of the third lateral plate far away from the first shield and a lateral surface of the first lateral plate far away from the first shield are both higher than a lateral surface of the fourth lateral plate far away from the first shield, a push-pull mouth is defined by the lateral surface of the fourth lateral plate, the first lateral plate and the third lateral plate, and the push-pull mouth is fitted with one of edges of the second shield.

According to some embodiments of the present disclosure, each of the first lateral plate and the second lateral plate is a straight plate, and each of the third lateral plate and the fourth lateral plate is a U-shaped plate.

A housing for a box fan according to embodiments of a second aspect of the present disclosure includes a first shield and a second shield, arranged opposite to and spaced from each other, and each of the first shield and the second shield being configured as a rectangle; and a frame, arranged between the first shield and the second shield, comprising a first lateral plate, a second lateral plate, a third lateral plate and a fourth lateral plate which are joined and mounted head to tail sequentially along a peripheral direction of the frame, the first lateral plate and the third lateral plate being arranged opposite to each other and being joined and mounted to two opposite edges of the first shield respectively, the second lateral plate and the fourth lateral plate being arranged opposite to each other and being joined and mounted to the other two opposite edges of the first shield respectively, the second shield being pushable and pullable relative to the frame and being fitted with the first lateral plate, the second lateral plate and the third lateral plate.

The housing for the box fan according to embodiments of the present disclosure has a simple assembly process, high assembly efficiency, low cost and the like.

An assembly method for a box fan according to embodiments of a third aspect of the present disclosure is provided, the box fan includes a first shield, a second shield, a frame and a fan-blade electric motor, the assembly method includes two steps with an interchangeable sequence. The two steps includes mounting the fan-blade electric motor to the first shield; and joining and mounting the frame to the first shield through a structure of the frame itself and a structure of the first shield itself. After the above two steps, the assembly method further includes a step of joining and mounting the second shield to the frame through a structure of the second shield itself and a structure of the frame itself by means of pushing and pulling.

The assembly method for the box fan according to embodiments of the present disclosure has an easy operation, high efficiency, low cost and the like.

According to some embodiments of the present disclosure, the frame is constituted of a plurality of lateral plates, the assembly method includes joining and mounting the plurality of lateral plates to the first shield respectively, and joining and mounting the plurality of lateral plates head to tail.

According to some embodiments of the present disclosure, the frame is constituted of a first lateral plate, a second lateral plate, a third lateral plate and a fourth lateral plate, the assembly method includes: joining and mounting the fourth lateral plate to the first shield; joining and mounting the first lateral plate and the third lateral plate to the first shield and to the fourth lateral plate respectively; joining and mounting the second lateral plate to the first shield and to the first lateral plate and the third lateral plate; pushing the second shield from the fourth lateral plate to a position among the first lateral plate, the second lateral plate and the third lateral plate and joining and mounting the second shield to the first lateral plate, the second lateral plate and the third lateral plate respectively.

According to some embodiments of the present disclosure, the fourth lateral plate is pushed towards the first shield in a plane of the first shield, so as to be joined and mounted to the first shield.

According to some embodiments of the present disclosure, the first lateral plate and the third lateral plate are pushed towards the fourth lateral plate in the plane of the first shield, so as to be joined and mounted to the first shield and the fourth lateral plate.

According to some embodiments of the present disclosure, the second lateral plate is pushed towards the fourth lateral plate in the plane of the first shield, so as to be joined and mounted to the first shield, the first lateral plate and the third lateral plate.

Additional aspects of embodiments of present disclosure will be given in part in the following descriptions, become apparent in part from the following descriptions, or be learned from the practice of the embodiments of the present disclosure.

REFERENCE NUMERALS

Figure 1:
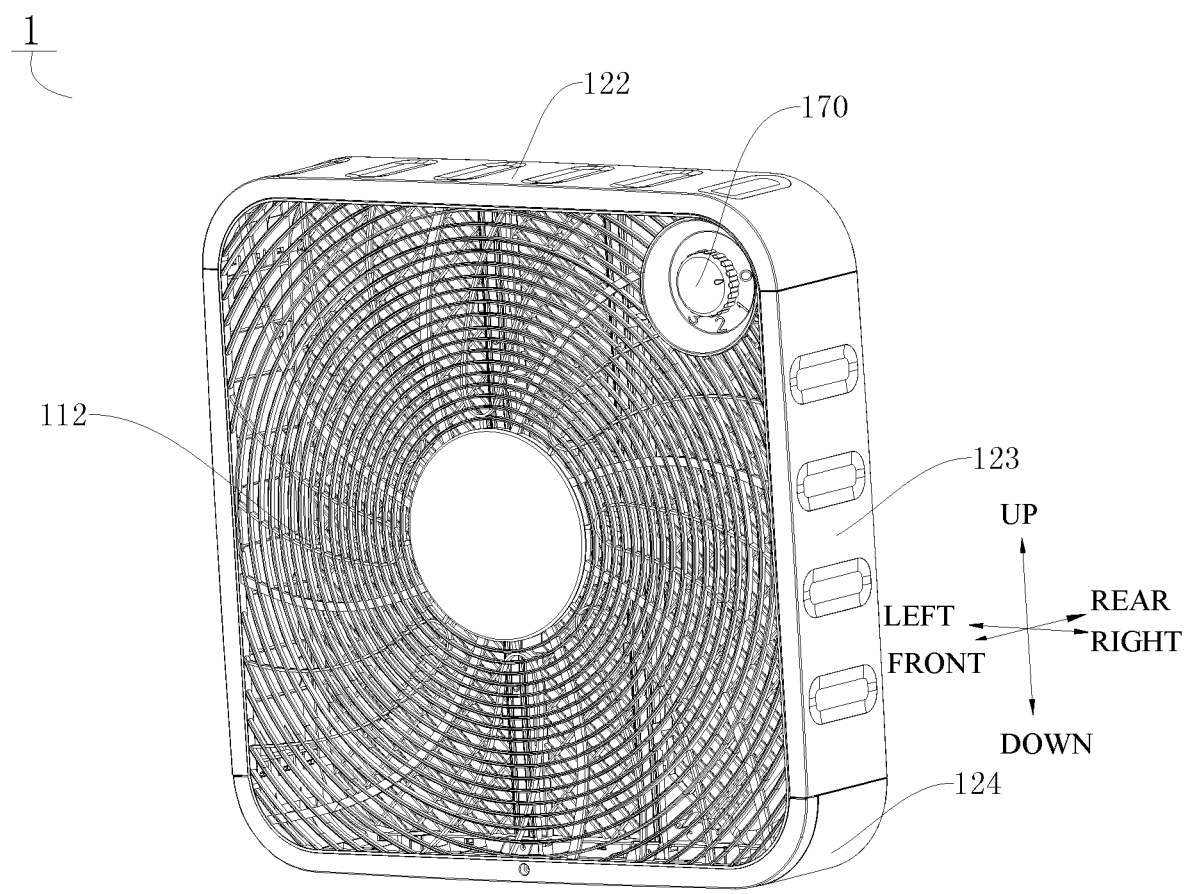
FIG. 1 is a schematic view of a housing of a box fan according to embodiments of the present disclosure.

Box fan 1,
Housing 100,
first shield 111, second shield 112,
first lateral plate 121, first lateral plate front surface 121a,
second lateral plate 122, second lateral plate front surface 122a,
third lateral plate 123, third lateral plate front surface 123a,
fourth lateral plate 124, fourth lateral plate front surface 124a,
limiting groove 125, push-pull groove 126, push-pull mouth 127, ornamental rim 128,
insertion 130, insertion groove 140,
first snap hole 150a, second snap hole 150b,
first snap 160a, second snap 160b,
control switch 170,
fan-blade electric motor 200.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure.

A box fan 1 according to embodiments of the present disclosure will be described below in detail with reference to FIGS. 1 to 16.

Referring to FIGS. 1 to 16, the box fan 1 according to embodiments of the present disclosure includes a housing 100 and a fan blade (not illustrated). The fan blade is rotatably arranged in the housing 100, in other words, the fan blade is accommodated in the housing 100, such that the fan blade can be protected by the housing 100, and a user can be prevented from touching the rotating fan blade, which otherwise can cause damage to the user.

Figure 2:
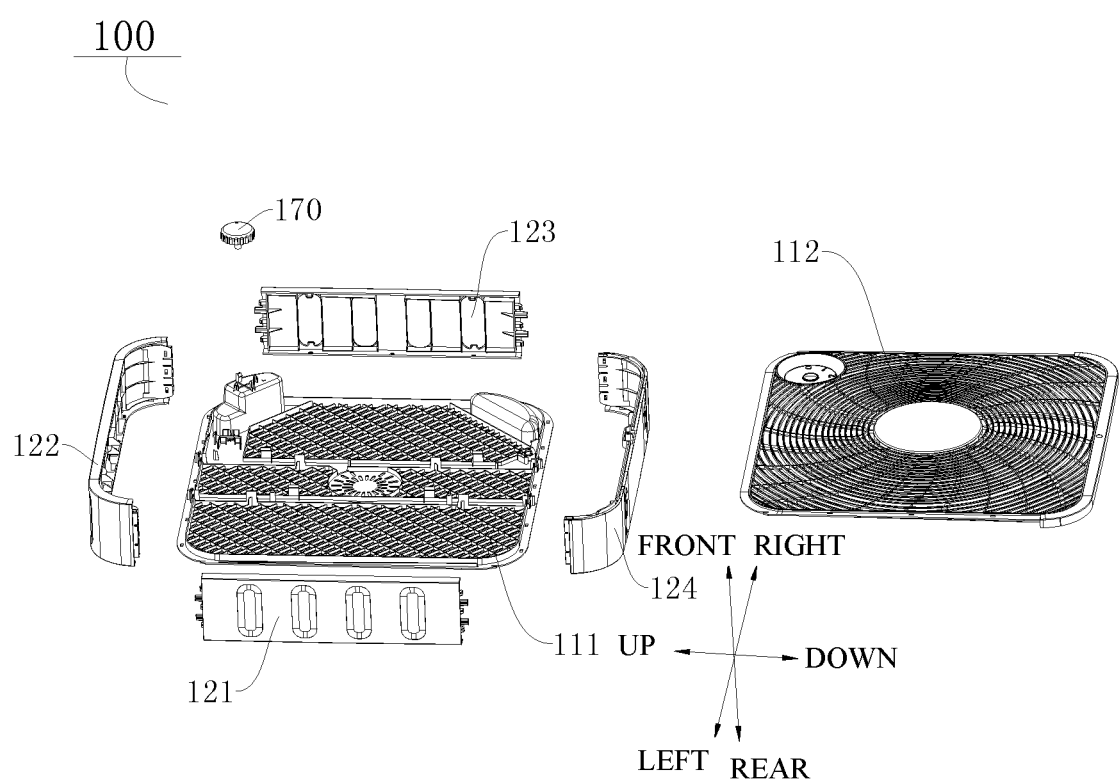
FIG. 2 is an exploded view of the housing shown in FIG. 1.

In one embodiment, referring to FIG. 2, the housing 100 includes two shields (for example, a first shield 111 and a second shield 112, as illustrated in FIG. 2) and a frame (for example, which is formed by a first lateral plate 121, a second lateral plate 122, a third lateral plate 123 and a fourth lateral plate 124, as illustrated in FIG. 2). The two shields are opposite to and spaced from each other (for example, the first shield 111 and the second shield 112 are opposite to and spaced from each other in a front-rear direction). The frame is arranged between the two shields. The frame and the two shields are joined and mounted through their own structures respectively, and at least one of the shields is pushably and pullably mounted and dismounted relative to the frame. In other words, the two shields are joined and mounted to the frame, and one of the two shields is pushably and pullably mounted and dismounted relative to the frame, or both the two shields are pushably and pullably mounted and dismounted relative to the frame. For example, in an example shown in FIG. 3, referring to an assembly step S4, an embodiment is illustrated, in which one shield is joined and assembled to the frame in a pushable and pullable manner.

It should be understood that, the expression "two parts are joined and mounted through their own structures" can be construed as follows, the two parts can be connected through the structures on the two parts themselves, such that the two parts can be connected firmly.

The expression "the two parts can be assembled and disassembled through pushing and pulling" refers to conditions as follows, the assembly and disassembly can be achieved through pushing and pulling movements, in other words, process of joining and mounting may need to be accompanied by the pushing and pulling movements. In such case, during the assembly of the frame and the shields, the joining and mounting can be achieved by immobilizing the frame while pushing and pulling the shields, or by immobilizing the shields while pushing and pulling the frame.

For the box fan 1 according to embodiments of the present disclosure, since the two shields are both mounted to the frame by means of joining, compared with the related art that the shields and the frame are connected through a screw, the number of screws is reduced sharply. Therefore, not only the process of mounting screws is omitted, thereby simplifying the assembly process of the housing 100 and improving the assembly efficiency of the housing 100, but also the cost of materials and production of the large amount of screws can be omitted, thereby reducing the production cost of the box fan 1.

Moreover, at least one of the shields can be mounted to and dismounted from the frame through pushing and pulling relative to the frame, when mounting or dismounting the shields, the shields can be mounted and dismounted by pushing or pulling the shields or the frame, such that alignment between the shields and the frame can be facilitated during installation, so as to mount the shields to the frame, thereby improving the production efficiency of the box fan 1, as well as a gap between the frame and the frame can be reduced in size, making the appearance of the box fan 1 more neatly and aesthetic.

Therefore, as for the box fan 1 according to embodiments of the present disclosure, the assembly process of the housing can be simplified, the assembly efficiency of the housing can be improved, the parts for assembling the housing can be decreased, and the production cost can be reduced.

The box fan 1 according to specific embodiments of the present disclosure will be described below with reference to the drawings.

In one embodiment, both of the two shields and the frame can be plastic parts. The plastic part can be made from PT, PET (polyethylene terephthalate), PBT (polybutylene terephthalate), PP (polymer polypropylene), ABS (Acrylonitrile butadiene Styrene copolymers) and the like. In one embodiment, both of the two shields and the frame are injection molded parts. In such case, the manufacture process of the two shields and the frame can be simplified, the manufacture of the two shields and the frame can be facilitated, as well as the structures on the two shields and the frame for the joining and mounting can be conveniently formed, so as to improve the production efficiency of the two shields and the frame.

In one embodiment, at least one of the shields is connected to the frame through snapping and/or fitted with the frame through insertion. In other words, one of or the two shields, which is pushably and pullably mounted and dismounted relative to the frame, can be jointed and mounted to the frame by means of snap connection and/or insertion fit. Therefore, the joining and mounting can be achieved by the simple structures, thereby reducing the machining difficulty of the shields and the frame, reducing the production cost and improving the production efficiency.

In an embodiment of the present disclosure, the frame includes a plurality of lateral plates which are joined and mounted head to tail sequentially. In other words, the frame is constituted by the plurality of lateral plates, and the plurality of lateral plates are connected head to tail to form a ring in which two adjacent lateral plates are joined and mounted. Therefore, the structure of each lateral plate can be simplified, and the machining and manufacture difficulties of the frame can be reduced, thereby saving a production cycle, and reducing the production cost.

In one embodiment, two adjacent lateral plates are connected through snap-connection and/or insertion fit. In one embodiment, the joining and mounting are achieved by means of the snap connection and the insertion fit (for example, through snap connection between a second snap 160b and a second snap hole 150b and insertion fit between an insertion 130 and an insertion groove 140, as illustrated in FIGS. 4, 5, 8 and 9). Therefore, diversity of the connection structures between the adjacent lateral plates can be increased, so as to improve the connection strength and stability of the two adjacent lateral plates.

Referring to FIGS. 1 to 10, the housing 100 according to a specific embodiment of the present disclosure will be described below.

Referring to FIGS. 1 and 2, the two shields are the first shield 111 and the second shield 112 arranged opposite to each other. Each of the first shield 111 and the second shield 112 can be configured as a rectangle. The frame can include the first lateral plate 121, the second lateral plate 122, the third lateral plate 123 and the fourth lateral plate 124 which are connected head to tail sequentially through snap connection. The first lateral plate 121 and the third lateral plate 123 are arranged opposite to each other and fitted with two opposite edges of the first shield 111 respectively. The second lateral plate 122 and the fourth lateral plate 124 are arranged opposite to each other and fitted with two opposite edges of the first shield 111 respectively. The second shield 112 is pushable and pullable with respect to the frame and is fitted with the first lateral plate 121, the second lateral plate 122 and the third lateral plate 123.

In one embodiment, the first shield 111 and the second shield 112 can be arranged parallel to each other. The first lateral plate 121 and the third lateral plate 123 are arranged parallel to each other and connected with two opposite edges of the first shield 111 respectively through snap connection. The second lateral plate 122 and the fourth lateral plate 124 are parallel to each other and connected with two opposite edges of the first shield 111 respectively through snap connection. The second shield 112 is pushable and pullable with respect to the frame and is connected with the first lateral plate 121, the second lateral plate 122 and the third lateral plate 123 respectively through snap connection. For example, the second shield 112 can be further limited by the snaps on the first lateral plate 121, the second lateral plate 122 and the third lateral plate 123 after being mounted in place by pushing and pulling. The second shield 112 is located in front of the first shield 111, i.e., the second shield 112 is a front shield, and the first shield 111 is a rear shield. The second shield 112 is provided with a fan-blade electric motor 200, the fan blade is mounted to the fan-blade electric motor 200, so as to rotate under the drive of the fan-blade electric motor 200.

It should be understood herein that, the structure including an arc transition should also be construed as the rectangle of the present disclosure, for example, as for the first shield 111 and the second shield 112 illustrated in the drawings, corners of the two shields are all arc transitions.

In other words, the first shield 111 and the second shield 112 are both configured as rectangles and parallel to each other. The first lateral plate 121, the second lateral plate 122, the third lateral plate 123 and the fourth lateral plate 124 are connected head to tail sequentially to form a rectangle. Two opposite lateral plates are parallel to each other and joined and mounted to the two opposite edges of the first shield 111 respectively, and two adjacent lateral plates are joined and mounted through the snap. The second shield 112 is connected with the first lateral plate 121, the second lateral plate 122 and the third lateral plate 123 respectively through snap connection and is pushable and pullable with respect to the frame. Therefore, the processing of the frame and the assembly of the housing 100 are convenient, thereby improving the production efficiency of the box fan 1.

Figure 4:
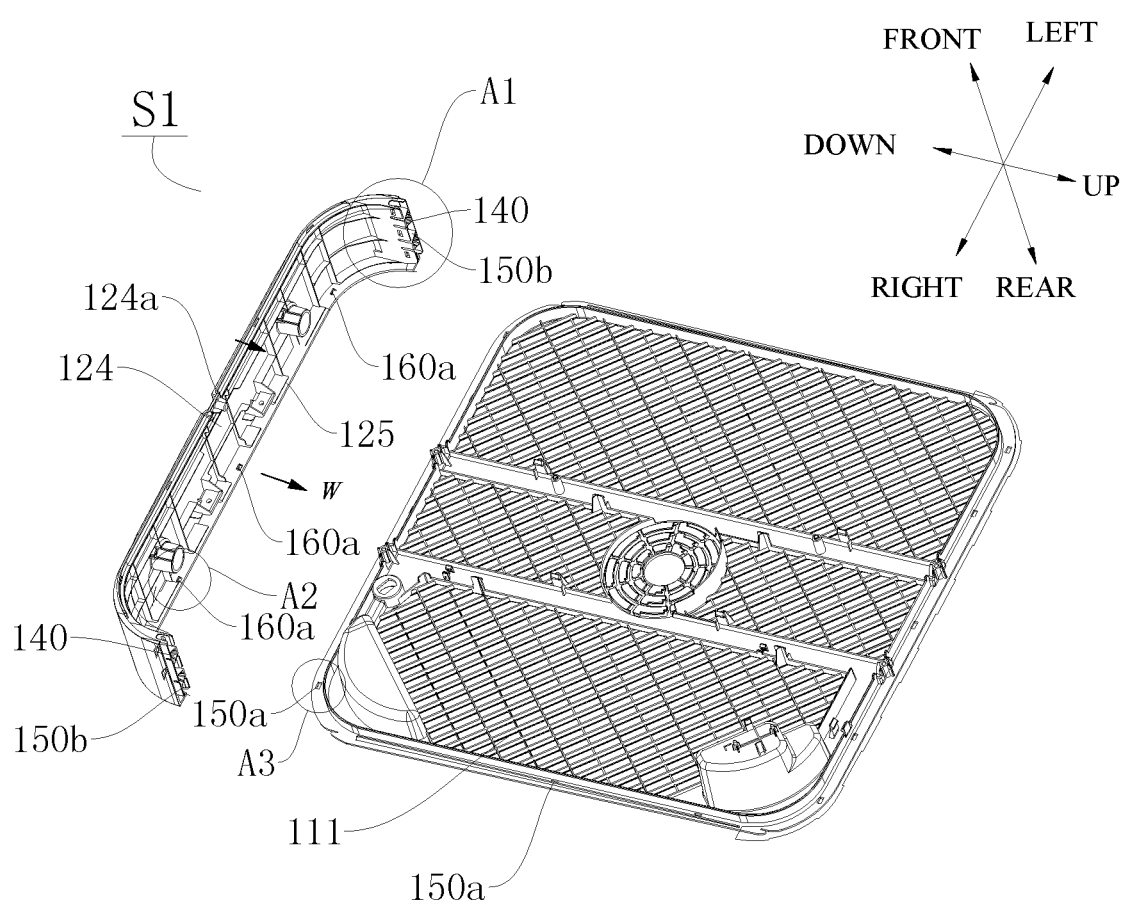
FIG. 4 is a schematic view of an assembly process S1 shown in FIG. 3, in which a fan-blade electric motor is not shown.
Figure 5:
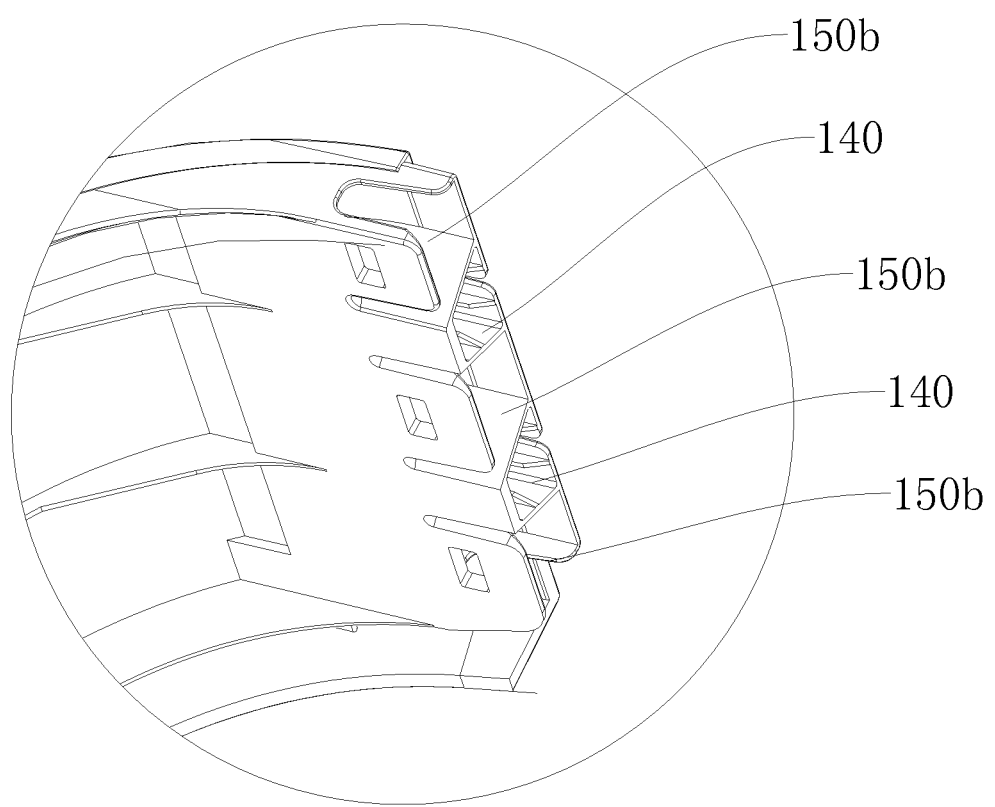
FIG. 5 is an enlarged view of a portion A1 circled in FIG. 4.

In one embodiment, the snap connections between the lateral plates and the first shield 111 are the same, and the snap connection between the fourth lateral plate 124 and the first shield 111 is elaborated as an example below. Referring to FIG. 4, a portion of the fourth lateral plate 124 in connection with the first shield 111 can be provided with a plurality of first snaps 160a, a portion of the first shield 111 in connection with the fourth lateral plate 124 can define a plurality of first snap holes 150a, and the plurality of first snaps 160a are configured to be snapped into the plurality of first snap holes 150a by one to one correspondence, thereby achieving insertion connection between the fourth lateral plate 124 and the first shield 111. In the same way, the first lateral plate 121, the third lateral plate 123 and the fourth lateral plate 124 can be joined and mounted to the first shield 111 through their own first snaps 160a and first snap holes 150a.

The connections between the two adjacent lateral plates can be the same, and the snap connection between the first lateral 121 and the fourth lateral plate 124 is elaborated as an example below. In one embodiment, two ends of the first lateral 121 are provided with a protruding snap structure, two ends of the third lateral plate 123 are provided with a protruding snap structure, two ends of the second lateral plate 122 are provided with a recessed snap hole structure, and the fourth lateral plate 124 are provided with a recessed snap hole structure.

Referring to FIGS. 4, 5, 8 and 9, an end (a lower end of the first lateral plate 121 illustrated in FIG. 8) of the first lateral plate 121 joined and mounted to the fourth lateral plate 124 is provided with a plurality of second snaps 160b, and an end (a left end of the fourth lateral plate 124 illustrated in FIG. 8) of the fourth lateral plate 124 joined and mounted to the first lateral plate 121 is provided with a plurality of second snap holes 150b. The plurality of second snap holes 150b are connected with the plurality of second snaps 160b on the first lateral plate 121 by one to one correspondence, thereby joining and mounting the first lateral plate 121 to the fourth lateral plate 124. In the same way, the first lateral plate 121, the second lateral plate 122, the third lateral plate 123 and the fourth lateral plate 124 can also be joined and mounted through their own second snaps 160b and second snap holes 150b.

Certainly, the present disclosure is not limited to this. In other embodiments of the present disclosure, the first lateral plate 121, the second lateral plate 122, the third lateral plate 123 and the fourth lateral plate 124 can also be configured to have other shapes, for example, each of the first lateral plate 121 and the second lateral plate 122 is a straight plate, each of the third lateral plate 123 and the fourth lateral plate 124 can be a U-shaped plate. In one embodiment, two corners at a lower end of the first shield 111 are covered by two ends of the fourth lateral plate 124, and two corners at an upper end of the first shield 111 are covered by two ends of the second lateral plate 122. Two corners at a lower end of the second shield 112 are covered by the two ends of the fourth lateral plate 124, and two corners at an upper end of the second shield 112 are covered by the two ends of the second lateral plate 122.

Figure 6:
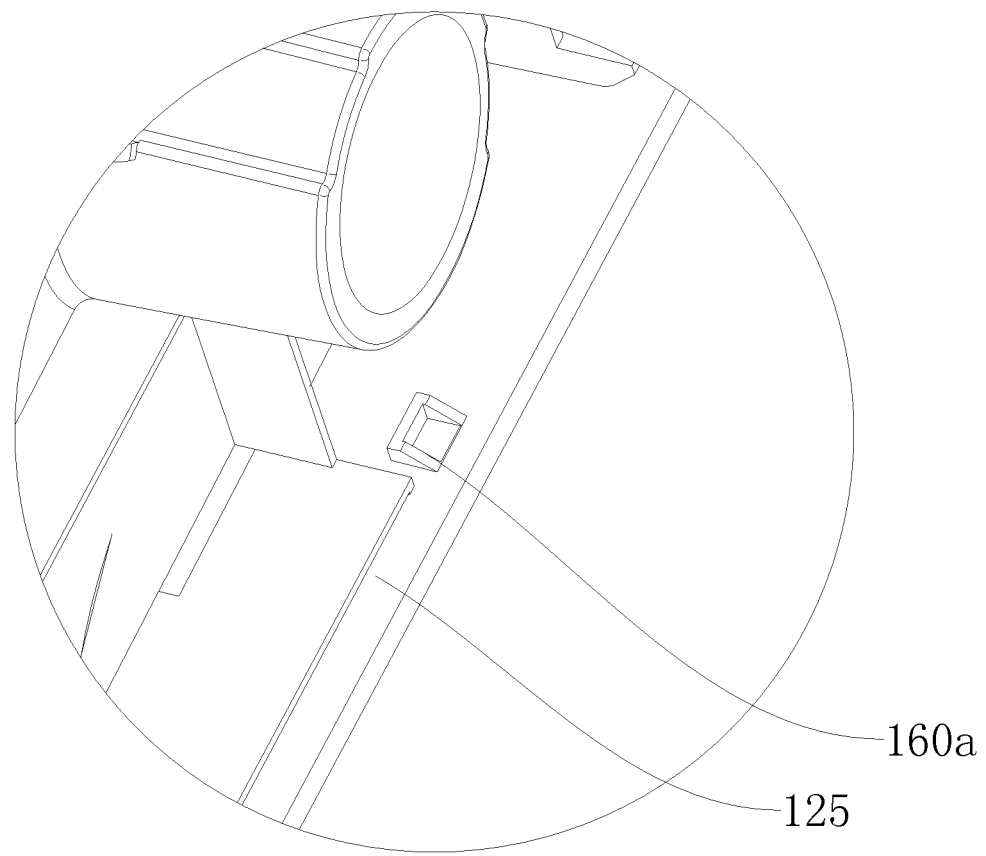
FIG. 6 is an enlarged view of a portion A2 circled in FIG. 4.
Figure 7:
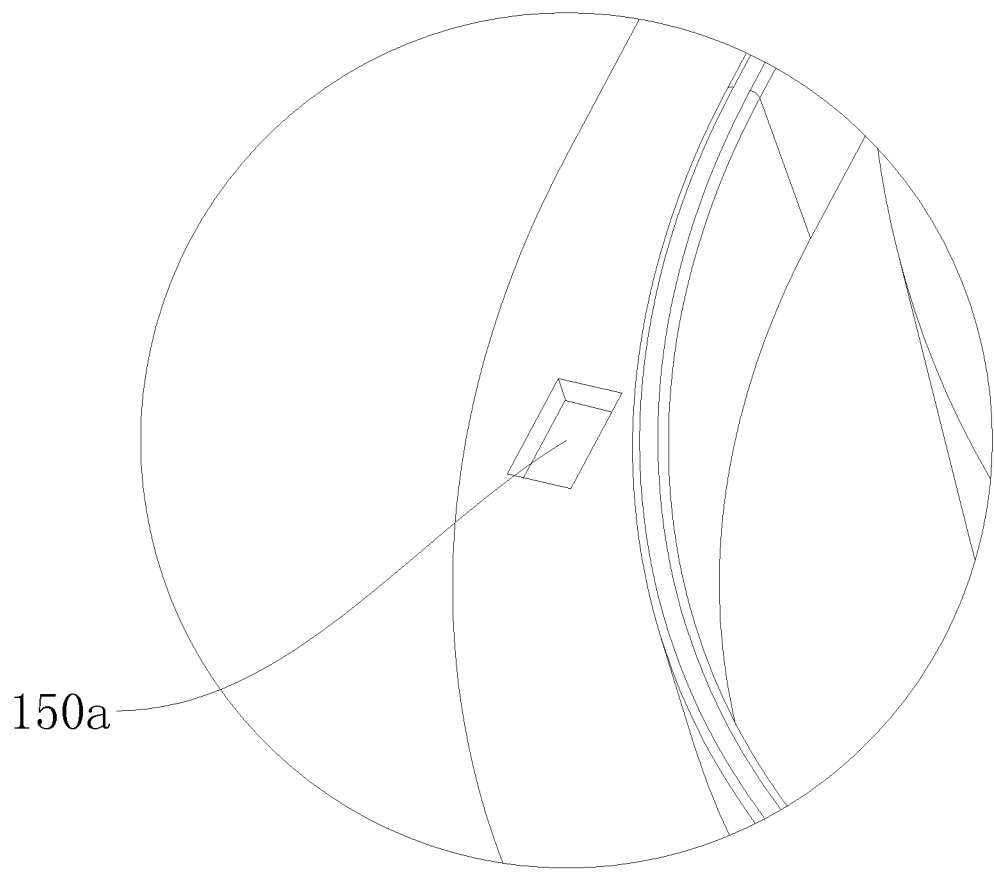
FIG. 7 is an enlarged view of a portion A3 circled in FIG. 4.
Figure 9:
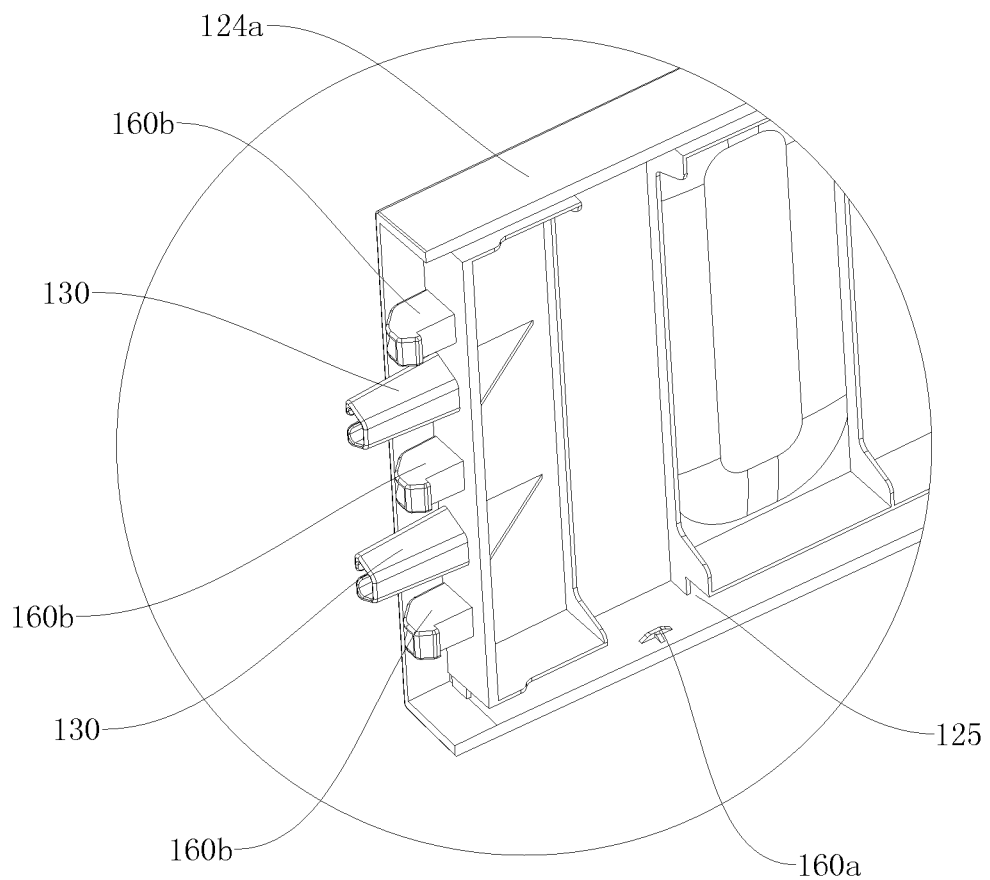
FIG. 9 is an enlarged view of a portion B1 circled in FIG. 8.

In one embodiment, referring to FIGS. 6 and 9, the first lateral plate 121, the second lateral plate 122, the third lateral plate 123 and the fourth lateral plate 124 are respectively provided with limiting grooves 125. Four edges of the first shield 111 are respectively inserted in the corresponding limiting grooves 125. Thus, when the lateral plates are assembled with the first shield 111 by the insertion fit in advance, operation of the snap connection can be achieved smoothly, such that the lateral plates can be assembled with the first shield conveniently and quickly, and the reliability of the connections between the first lateral plate 121, the second lateral plate 122, the third lateral plate 123, the fourth lateral plate 124 and the first shield 111 can be enhanced, avoiding a gap at junction between the first shield 111 and the lateral plates, and the edges and corners of the first shield 111 are covered by the first lateral plate 121, the second lateral plate 122, the third lateral plate 123 and the fourth lateral plate 124, ensuring the aesthetic appearance of the housing 100.

The limiting grooves 125 in the first lateral plate 121 and the third lateral plate 123 are wedge-shaped grooves, and each of the wedge-shaped grooves has a width increasing gradually in a direction from the second lateral plate 122 to the fourth lateral plate 124. It should be understood that, "width of the limiting groove" refers to a distance between two opposite lateral walls of the limiting groove 125 oriented in a length direction. In such case, during the assembly, when pushing the first lateral plate 121 and the third lateral plate 123, the edges of the first shield 111 can conveniently enter the limiting grooves 125 on the first lateral plate 121 and the third lateral plate 123, and along with the pushing-in of the first lateral plate 121 and the third lateral plate 123, the fit between the edges of the first shield 111 and the limiting grooves 125 on the first lateral plate 121 and the third lateral plate 123 gradually becomes tight, thereby improving the reliability of the assembled first shield 111, first lateral plate 121 and third lateral plate 123.

In a further embodiment, two adjacent lateral plates among the first lateral plate 121, the second lateral plate 122, the third lateral plate 123 and the fourth lateral plate 124 are fitted with each other through insertion connection between the insertion 130 and the insertion groove 140. In one embodiment, the insertion fits between two adjacent lateral plates can be the same, and the insertion fit between the first lateral plate 121 and the fourth lateral plate 124 is elaborated as an example below. For example, in examples shown in FIGS. 4, 5, 8 and 9, the end (the lower end of the first lateral plate 121 illustrated in FIG. 8) of the first lateral plate 121 joined and mounted to the fourth lateral plate 124 is provided with a plurality of insertions 130, and the end (the left end of the fourth lateral plate 124 illustrated in FIG. 8) of the fourth lateral plate 124 joined and mounted to the first lateral plate 121 is provided with a plurality of insertion grooves 140. The plurality of insertion grooves 140 are connected with the plurality of insertions 130 on the first lateral plate 121 by one to one correspondence, thereby joining and mounting the first lateral plate 121 to the second lateral plate 122. Therefore, when the insertion 130 is inserted in the insertion groove 140 in place, the second snap 160b can be fitted with the second snap hole 150b promptly through snap connection, thereby improving the assembly efficiency. In addition, the insertion 130 and the insertion groove 140 are easy to process and convenient to achieve. In the same way, the first lateral plate 121, the second lateral plate 122, the third lateral plate 123 and the fourth lateral plate 124 can also be joined and mounted by means of the insertion 130 and the insertion groove 140.

Figure 13:
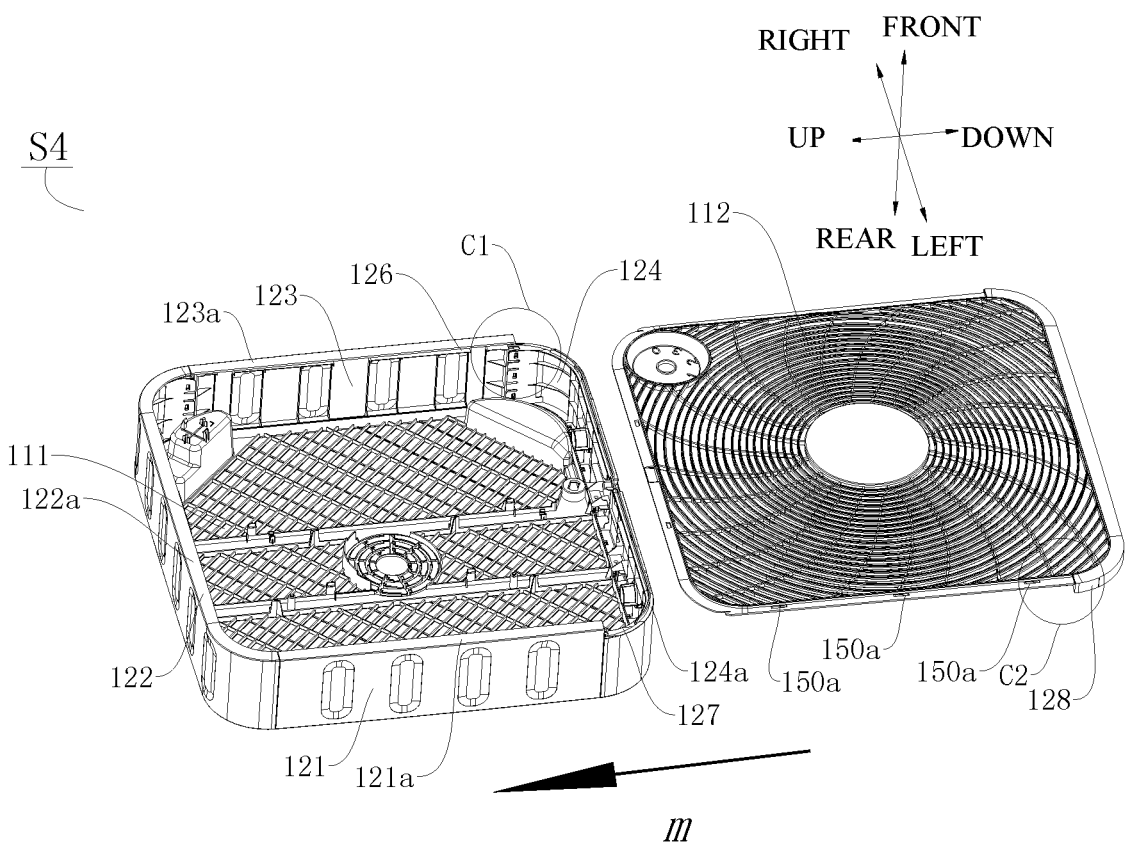
FIG. 13 is a schematic view of an assembly process S4 shown in FIG. 3, in which the fan-blade electric motor is not shown.
Figure 14:
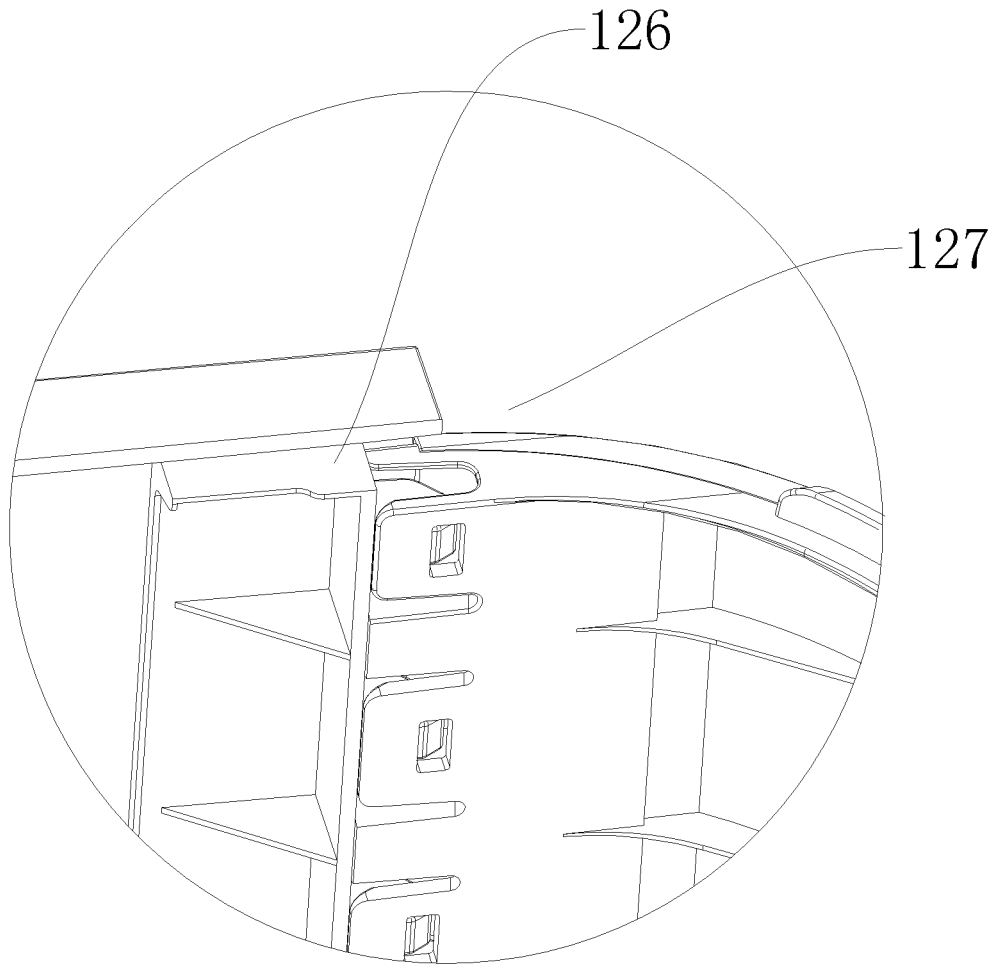
FIG. 14 is an enlarged view of a portion C1 circled in FIG. 13.

In one embodiment, referring to FIG. 13, each of the first lateral plate 121, the second lateral plate 122 and the third lateral plate 123 is provided with a push-pull groove 126, the second shield 112 is pushably and pullably fitted with the push-pull groove 126. Therefore, by pushing and pulling the second shield 112, the second shield 112 is enabled to pass through a push-pull mouth 127 and fitted in the push-pull grooves 126 of the first lateral plate 121, the second lateral plate 122 and the third lateral plate 123, thereby joining and mounting the second shield 112 with the three lateral plates, and effectively improving the assembly efficiency.

In one embodiment, the fourth lateral plate 124 defines the push-pull mouth 127, and the second shield 112 is pushably and pullably fitted with the push-pull groove 126 through the push-pull mouth 127. For example, in an example shown in FIG. 13, each of the first lateral plate 121, the second lateral plate 122 and the third lateral plate 123 defines the push-pull groove 126 extending in the length direction thereof. The fourth lateral plate 124 defines the push-pull mouth 127 extending in the length direction of the fourth lateral plate 124. After the second shield 112 passes through the push-pull mouth 127, the second shield 112 can be pushed in the direction towards the second lateral plate 122 along the push-pull grooves 126 of the first lateral plate 121 and the third lateral plate 123, until one edge of the second shield 112 is fitted in the push-pull groove 126 of the second lateral plate 122, thereby completing the pushably and pullably joining and mounting between the second shield 112 and the frame. In addition, since the first shield 111 is rectangular in shape, and the first lateral plate 121, the second lateral plate 122, the third lateral plate 123 and the fourth lateral plate 124 are connected head to tail sequentially to form a rectangle, two lateral sides (left lateral side and right lateral side of the second shield 112, as illustrated in FIG. 13) of the second shield 112 can be continuously in contact with the push-pull grooves 126 of the first lateral plate 121 and the third lateral plate 123, thereby making it more convenient to achieve the pushing and pulling movement, and improving the assembly efficiency. In addition, the first lateral plate 121, the second lateral plate 122 and the third lateral plate 123 can be used to cover the edges and corners of the second shield 112.

Each of the push-pull grooves 126 of the first lateral plate 121 and the third lateral plate 123 is a wedge-shaped groove, and the wedge-shaped groove has a width increasing gradually in the direction from the second lateral plate 122 to the fourth lateral plate 124. It should be understood that, "width of the push-pull groove" refers to a distance between two opposite lateral walls of the push-pull groove 126 oriented in a length direction. In such case, during the assembly, when pushing the second shield 112, the edges of the second shield 112 can conveniently enter the push-pull grooves 126 in the first lateral plate 121 and the third lateral plate 123, and along with the pushing-in of the second shield 112, the fit between the edges of the second shield 112 and the push-pull grooves 126 in the first lateral plate 121 and the third lateral plate 123 gradually becomes tight, thereby improving the reliability of the assembled second shield 112, first lateral plate 121 and third lateral plate 123.

Certainly, the present disclosure is not limited to this, any three lateral plates among the first lateral plate 121, the second lateral plate 122, the third lateral plate 123 and the fourth lateral plate 124 can define the push-pull grooves 126, the rest one lateral plate defines the push-pull mouth 127, so as to achieve the push-pull assembly of the second shield 112.

In one embodiment, a lateral surface (a front surface 123a of the third lateral plate 123, as illustrated in FIG. 13) of the third lateral plate 123 far away from the first shield 111 and a lateral surface (a front surface 121a of the first lateral plate 121, as illustrated in FIG. 13) of the first lateral plate 121 far away from the first shield 111 are both higher than a lateral surface (a front surface 124a of the fourth lateral plate 124, as illustrated in FIG. 13) of the fourth lateral plate 124 far away from the first shield 111. The push-pull mouth 127 is defined by the lateral surface of the fourth lateral plate 124, the first lateral plate 121 and the third lateral plate 123. The push-pull mouth 127 is fitted with one of edges of the second shield 112. Thus, the push-pull mouth 127 can be conveniently defined, the structure and machining process of the frame are simplified, the production cycle of the frame is saved and the production cost of the frame is reduced.

In brief, during the assembly, when the height of the fourth lateral plate 124 is lower than those of the first lateral plate 121 and the third lateral plate 123, the push-pull mouth 127 can be easily obtained.

Certainly, the present disclosure is not limited to this, the push-pull mouth 127 can also be a long rectangular mouth penetrating the fourth lateral plate 124 and spaced from the front surface of the fourth lateral plate 124 (this example is not illustrated in the drawings).

Furthermore, the second shield 112 is connected with the first lateral plate 121, the second lateral plate 122 and the third lateral plate 123 through snap connection. After the second shield 112 is fitted with the three lateral plates through insertion connection, a firmer joining and mounting can be further achieved by means of snap connection, thereby effectively improving the reliability of the connection between the second shield 112 and the first lateral plate 121, the second lateral plate 122 and the third lateral plate 123. For example, in the example illustrated in FIG. 13, the portions of the first lateral plate 121, the second lateral plate 122 and the third lateral plate 123 in connection with the second shield 112 are provided with a plurality of first snaps 160a (it should be understood that, the plurality of first snaps 160a are arranged adjacent to front ends and a rear ends of the first lateral plate 121, the second lateral plate 122 and the third lateral plate 123, and the plurality of first snaps 160a adjacent to the front ends of the first lateral plate 121, the second lateral plate 122 and the third lateral plate 123 are not illustrated in the drawings). The second shield 112 defines a plurality of first snap holes 150a, and the plurality of first snap holes are connected with the plurality of first snaps 160a on the first lateral plate 121, the second lateral plate 122 and the third lateral plate 123 by one to one correspondence. The plurality of first snaps 160a are snapped into the plurality of first snap holes 150a respectively by one to one correspondence, thereby achieving the snap connection between the second shield 112 and the first lateral plate 121, the second lateral plate 122 and the third lateral plate 123. In such case, when the second shield 112 is mounted in place by pushing and pulling through insertion connection, the first snaps 160a can be snapped into the first snap holes 150a, so as to further position the second shield 112, thereby improving the stability of the mounted second shield 112.

Figure 15:
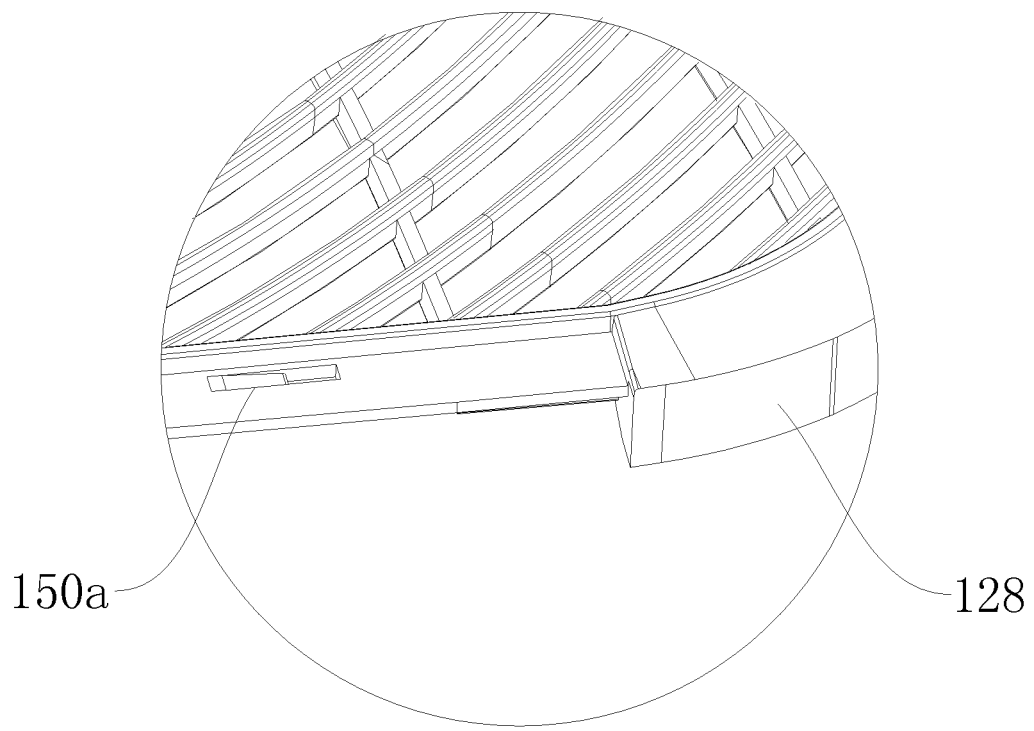
FIG. 15 is an enlarged view of a portion C2 circled in FIG. 13.
Figure 16:
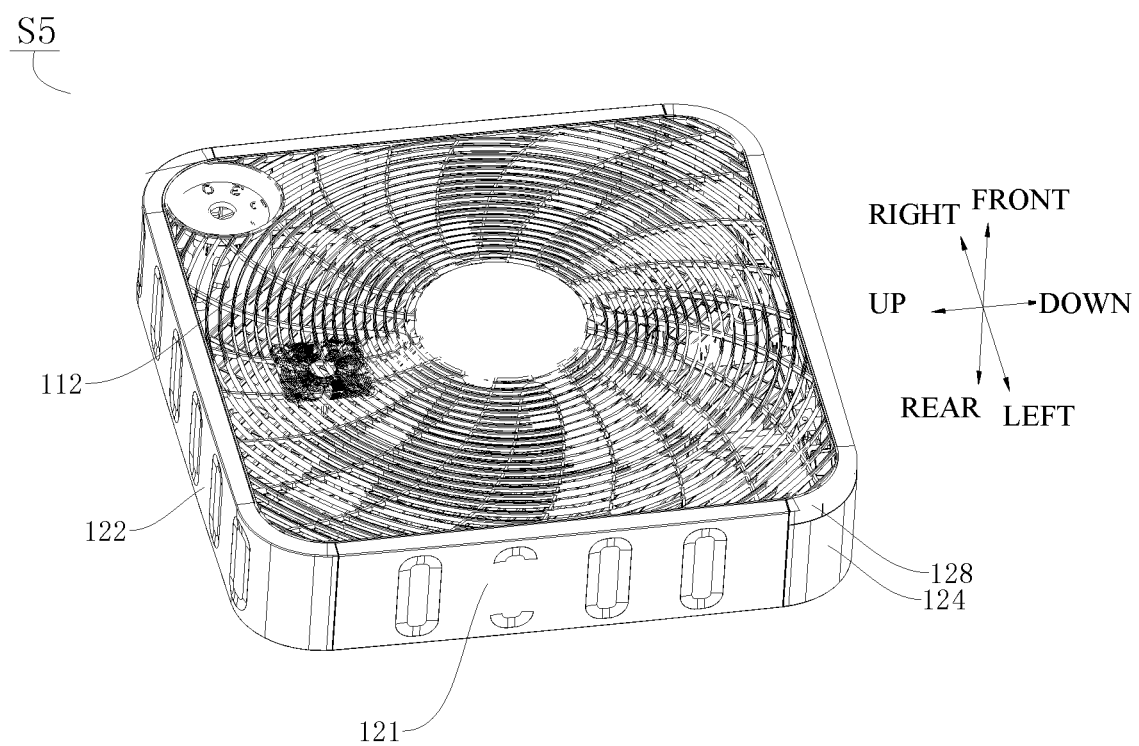
FIG. 16 is a schematic view of an assembly process S5 shown in FIG. 3.
Figure 17:
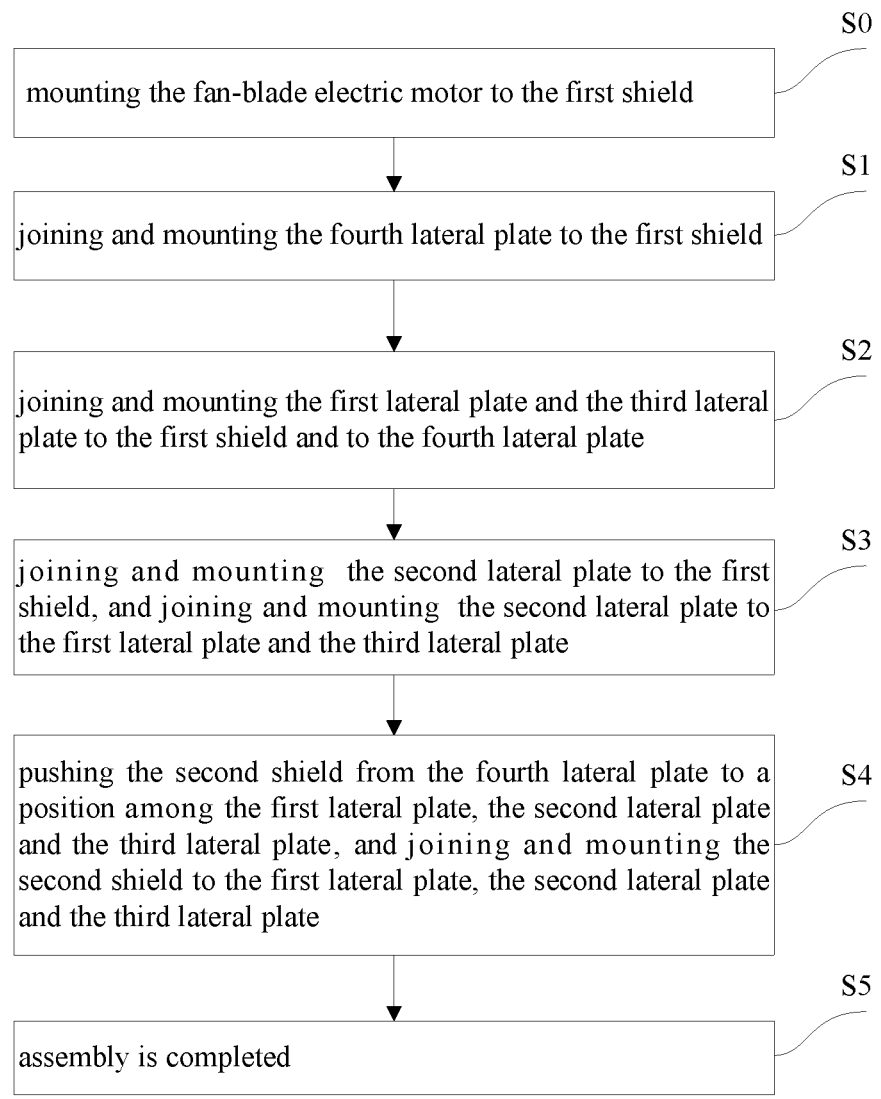
FIG. 17 is a flow chart of an assembly method for a box fan according to embodiments of the present disclosure.

Referring to FIGS. 13 and 15, the edge (a lower edge of the second shield 112, as illustrated in FIG. 13) of the second shield 112 adjacent to the fourth lateral plate 122 is provided with an ornament rim 128 for blocking the outside of the push-pull mouth 127. When the second shield 112 is joined and mounted to the frame in place, the ornament rim 128 blocks the push-pull mouth 127 exactly and is flush with an outer surface of the fourth lateral plate 124. Thus a gap between the second shield 112 and the fourth lateral plate 124 can be avoided, which otherwise influences the aesthetics, and the protection effect for the fan blade is improved. Dust can be prevented from entering the interior of the housing 100 through the push-pull mouth 127, thereby keeping the interior of the box fan clean.

It should be noted that, the shapes and amounts of the above first snap 160a, second snap 160b, first snap hole 150a, second snap hole 150b, insertion 130 and insertion groove 140 are not limited, as long as they can satisfy the assembly between the lateral plates (the first lateral plate 121, the second lateral plate 122, the third lateral plate 123 and the fourth lateral plate 124) and the shields (the first shield 111 and the second shield 112).

For the box fan 1 according to embodiments of the present disclosure, metal materials are replaced by plastic materials, thereby greatly reducing the material cost and the machining cost, improving the manufacturability of the box fan. The snap connection sharply decreases the amount of the \ screws, thereby reducing the production cost and improving the production efficiency. The plastic frame with the joined structure can improve the diversity of the appearance of the whole machine, which can satisfy the changing market preferences.

Other components (e.g. a control switch 170) and operations of the box fan 1 according to embodiments of the present disclosure, which will not be elaborated herein.

The housing 100 for the box fan according to embodiments of the present disclosure will be elaborated below.

The housing 100 for the box fan according to embodiments of the present disclosure includes the first shield 111, the second shield 112 and the frame. Each of the first shield 111 and the second shield 112 is configured as a rectangle, and the first shield 111 and the second shield 112 are opposite to and spaced from each other. The frame is arranged between the first shield 111 and the second shield 112 and includes the first lateral plate 121, the second lateral plate 122, the third lateral plate 123 and the fourth lateral plate 124 which are joined and mounted head to tail sequentially along the peripheral direction of the frame. The first lateral plate 121 and the third lateral plate 123 are opposite to each other and are joined and mounted to two opposite edges of the first shield 111 respectively. The second lateral plate 122 and the fourth lateral plate 124 are opposite to each other and are joined and mounted to the other two opposite edges of the first shield 111 respectively. The second shield 112 is pushable and pullable relative to the frame and is fitted with the first lateral plate 121, the second lateral plate 122 and the third lateral plate 123.

The housing for the box fan according to embodiments of the present disclosure has a simple assembly process, high assembly efficiency, low cost and the like.

An assembly method for a box fan according to embodiments of the present disclosure will be described below with reference to FIGS. 1 to 17, the box fan 100 according to the above embodiments of the present disclosure will be taken as an example of the box fan, the box fan 1 includes a shield 111, a second shield 112, a frame and a fan-blade electric motor 200. The assembly method includes two steps with an interchangeable sequence, and the two steps include: mounting the fan-blade electric motor 200 to the first shield 111; and joining and mounting the frame to the first shield 111 through a structure of the frame itself and a structure of the first shield 111 itself.

That is, the fan-blade electric motor 200 can be mounted to the first shield 111 first, and then the frame is joined and mounted to the first shield 111. Or the frame can be joined and mounted to the first shield 111 first, and then the fan-blade electric motor 200 is mounted to the first shield 111.

After the above two steps, the assembly method further includes a step of joining and mounting the second shield 112 to the frame through the structure of the second shield 112 itself and the structure of the frame itself by means of pushing and pulling.

For the assembly method for the box fan according to embodiments of the present disclosure, the assembly process of the box fan is simplified, the assembly efficiency of the box fan is improved and the amount of the screws can be sharply reduced, thereby reducing the material cost and the production cost of the box fan.

Moreover, the second shield is mounted by means of pushing and pulling, such that alignment between the shield and the frame can be facilitated during installation, so as to mount the shield to the frame, thereby improving the production efficiency of the box fan, as well as reducing a gap between the frame and the frame, and making the appearance of the box fan more neatly and aesthetic.

In an embodiment of the present disclosure, the frame is constituted by a plurality of lateral plates. During installation, the plurality of lateral plates are joined and mounted to the first shield 111 and are joined head to tail, such that the plurality of lateral plates form a frame on the first shield 111, thereby further facilitating the assembly of the frame and the first shield 111.

In one embodiment, the frame constituted by the first lateral plate 121, the second lateral plate 122, the third lateral plate 123 and the fourth lateral plate 124 is taken as an example to describe the assembly method for the frame.

The assembly method includes: joining and mounting the fourth lateral plate 124 to the first shield 111; joining and mounting the first lateral plate 121 and the third lateral plate 123 to the first shield 111, and joining and mounting the first lateral plate 121 and the third lateral plate 123 with the fourth lateral plate 124; joining and mounting the second lateral plate 122 to the first shield 111, and joining and mounting the second lateral plate 122 to the first lateral plate 121 and the third lateral plate 123; and pushing the second shield 112 from the fourth lateral plate 124 to a position among the first lateral plate 121, the second lateral plate 122 and the third lateral plate 123, and joining and mounting the second shield 112 to the first lateral plate 121, the second lateral plate 122 and the third lateral plate 123.

In one embodiment, as shown in FIG. 4, the fourth lateral plate 124 is pushed towards the first shield 111 in the plane of the first shield 111, so as to be joined and mounted to the first shield 111.

The first lateral plate 121 and the third lateral plate 123 are pushed towards the fourth lateral plate 124 in the plane of the first shield 111, so as to be joined and mounted to the first shield 111 and the fourth lateral plate 124.

The second lateral plate 122 is pushed towards the fourth lateral plate 124 in the plane of the first shield 111, so as to be joined and mounted to the first shield 111, the first lateral plate 121 and the third lateral plate 123. In such case, the assembly process of the housing 100 can be further simplified, and the labor intensity of the operator can be reduced.

It should be understood that, the plane of the first shield 111 refers to the plane of the largest area of the first faces shield 111, for example, the plane perpendicular to a front-rear direction in the drawings.

Certainly, the frame can also be constituted by a different amount of lateral plates, for example the frame is constituted by two lateral plates, during installation, the two lateral plates are joined and mounted to the first shield 111, and the two lateral plates are assembled to each other to form the frame.

Figure 3:
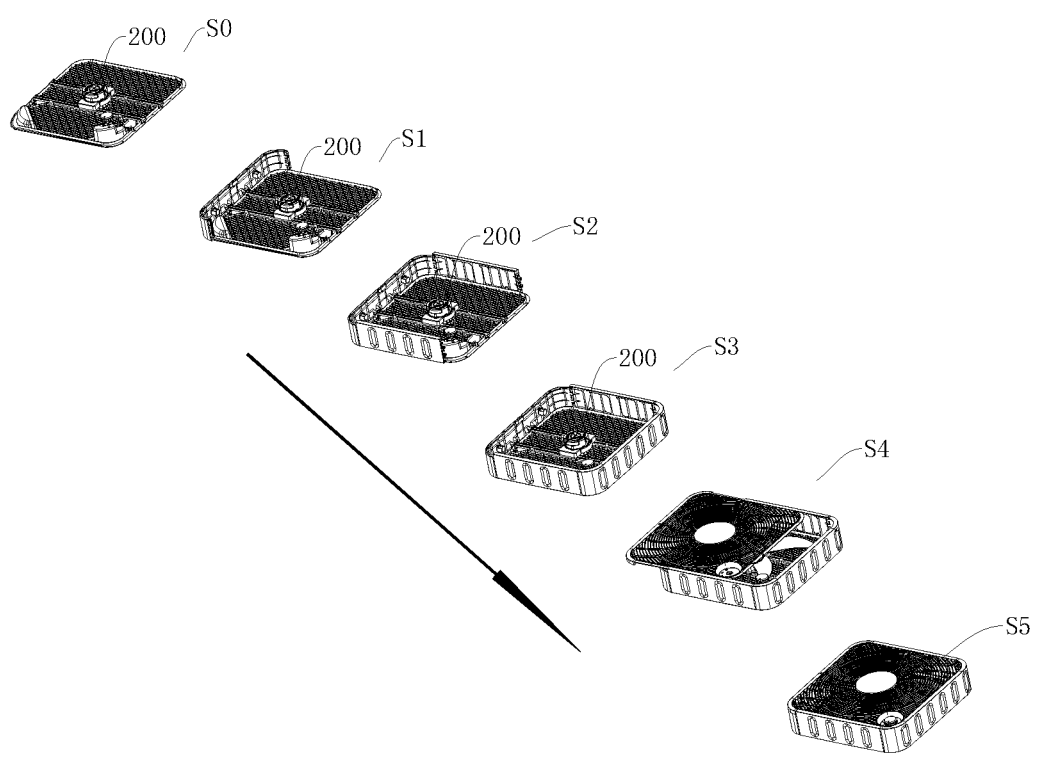
FIG. 3 illustrates an assembly process of a box fan, in which the assembly process includes S0 to S5 carried out in sequence.

An assembly process for the housing 100 according to a specific embodiment of the present disclosure will be described in brief with reference to FIG. 3 while combining FIGS. 4 to 16. The below description is just illustrative, used to elucidate the present disclosure, and shall not be construed to limit the present disclosure.

In step S0, the fan-blade electric motor 200 is mounted on the first shield 111.

In step S1, the fourth lateral plate 124 is mounted the first shield 111.

Figure 8:
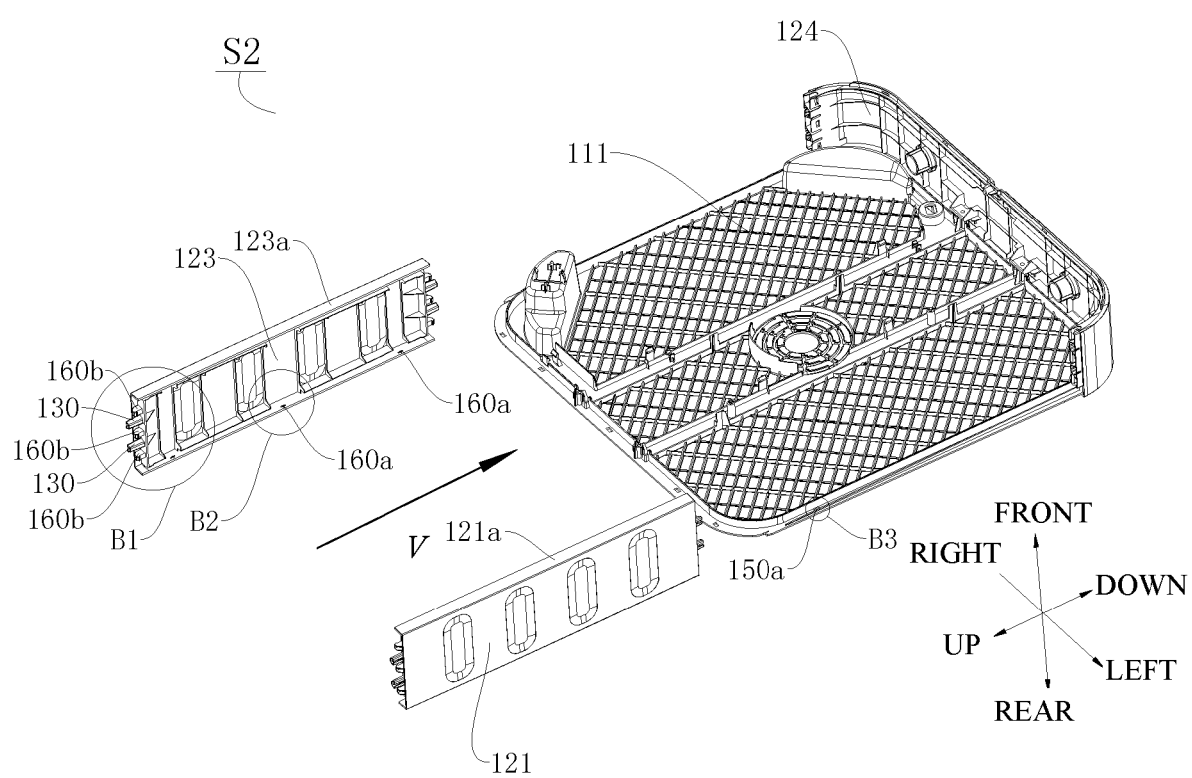
FIG. 8 is a schematic view of an assembly process S2 shown in FIG. 3, in which the fan-blade electric motor is not shown.

As shown in FIG. 4, the fourth lateral plate 124 is provided with five first snaps 160a (not illustrated one by one), the first shield 111 defines five first snap holes 150a (not illustrated one by one), the fourth lateral plate 124 is pushed in a direction of arrow W, the first snap 160a is snapped into the first snap hole 150a, as illustrated in FIG. 8, the assembly of the fourth lateral plate 124 and the first shield 111 is completed.

In step S2, the first lateral plate 121 and the second lateral plate 123 are mounted.

As shown in FIG. 8, two ends of the first lateral plate 121 are respectively provided with three second snaps 160b (not illustrated one by one) and two insertions 130 (not illustrated one by one) and two ends of the third lateral plate 123 are respectively provided with three second snaps 160b (not illustrated one by one) and two insertions 130 (not illustrated one by one). Two sides of the first lateral plate 121 are respectively provided with three first snaps 160a (not illustrated one by one), and two sides of the third lateral plate 123 are respectively provided with three first snaps 160a (not illustrated one by one). The first shield 111 defines three first snap holes 150a correspondingly (not illustrated one by one). The second lateral plate 122 defines second snap holes 150b and insertion grooves 140. The first lateral plate 121 and the third lateral plate 123 are pushed along the direction of arrow V, the first snaps 160a are snapped into the first snap hole 150a. The second snaps 160b are snapped into the second snap holes 150b. The insertions 130 are inserted in the insertion grooves 140. The installation of the first lateral plate 121 and the third lateral plate 123 is completed, as illustrated in FIG. 12.

In step S3, the second lateral plate 122 is mounted.

Figure 12:
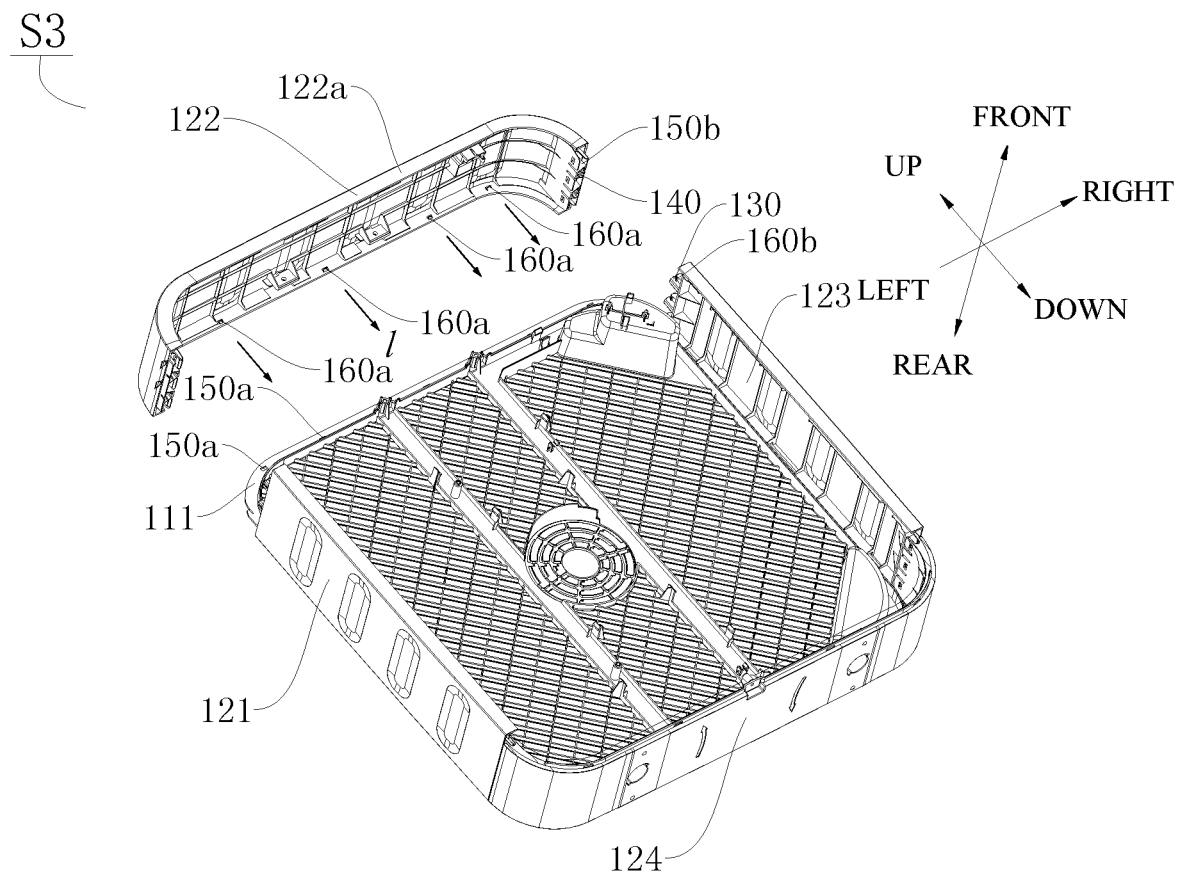
FIG. 12 is a schematic view of an assembly process S3 shown in FIG. 3, in which the fan-blade electric motor is not shown.

As illustrated in FIG. 12, after the first lateral plate 121 and the third lateral plate 123 are mounted, the second lateral plate 122 is mounted. A portion of the second lateral plate 122 in connection with the first shield 111 is provided with five first snaps 160a (not illustrated one by one), the first shield 111 defines five first snap holes 150a (not illustrated one by one), the first snaps 160a on the second lateral plate 122 are snapped in the first snap holes 150a by one to one correspondence. Two ends of the second lateral plate 122 define three second snap holes 150b (not illustrated one by one) and two insertion grooves 140 (not illustrated one by one) respectively, the three second snap holes 150b and the two insertion grooves 140 are connected with the first lateral plate 121 and the third lateral plate 123 through snap connection or insertion connection. The second lateral plate 122 is pushed along the direction of arrow 1, the first snaps 160a are snapped into the first snap holes 150a, the second snaps 160b are snapped into the second snap holes 150b, and the insertion groove 140 and the insertion 130 are limited through snap connection. The installation of the second lateral plate 122 is completed, as illustrated in FIG. 13.

In step S4: the second shield 112 is mounted.

Figure 10:
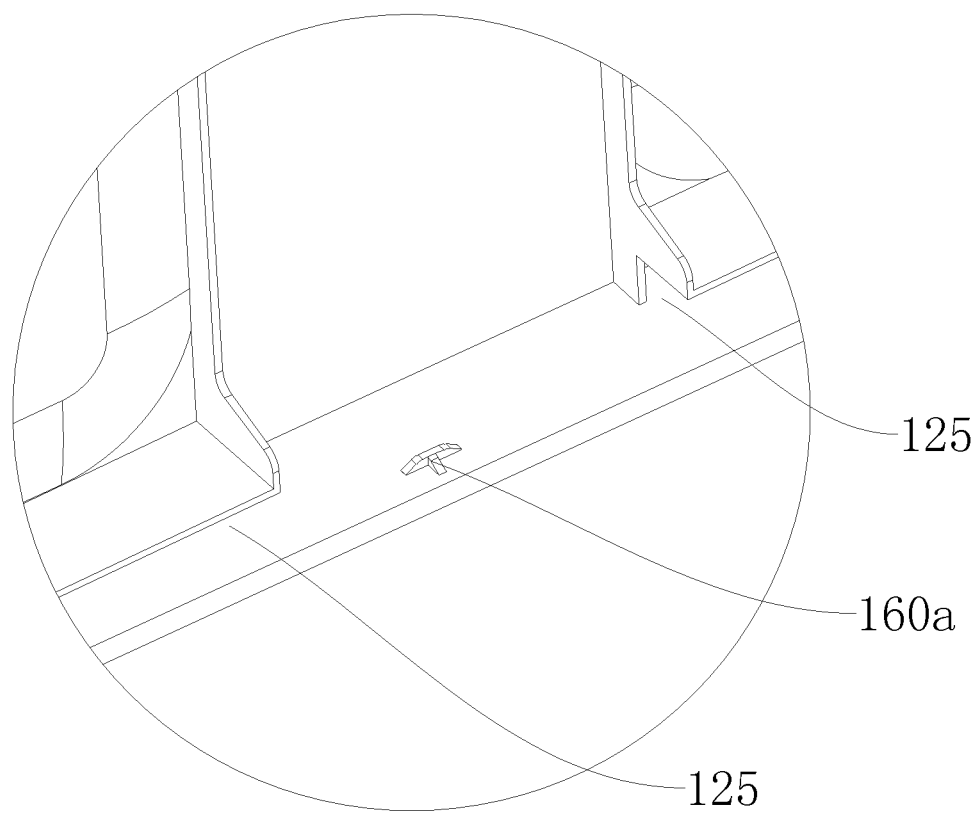
FIG. 10 is an enlarged view of a portion B2 circled in FIG. 8.
Figure 11:
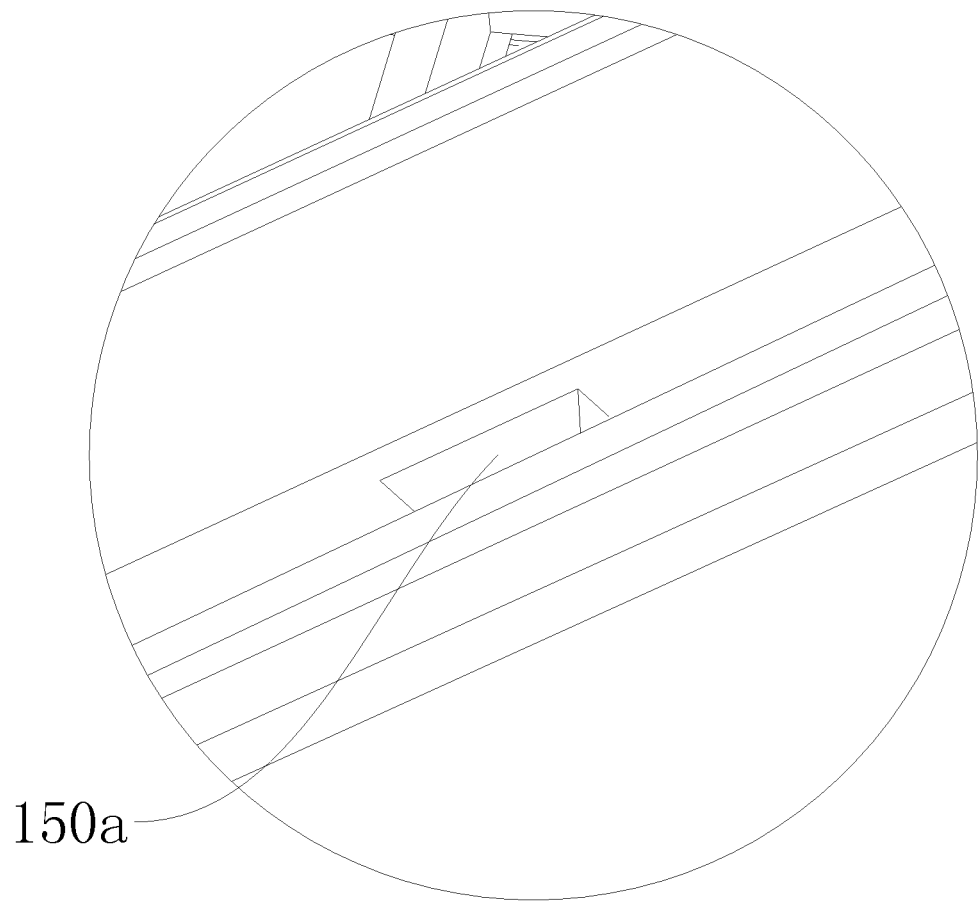
FIG. 11 is an enlarged view of a portion B3 circled in FIG. 8.

As illustrated in FIG. 13, after the second lateral plate 122 is mounted, the second shield 112 is mounted. The second shield 112 is pushed along the direction of arrow m, each of two edges of the second shield 112 adjacent to the first lateral plate 121 and the third lateral plate 123 defines three first snap holes 150a (not illustrated one by one), the edge of the second shield 112 adjacent to the fourth lateral plate 124 defines five first snap holes 150a (not illustrated one by one), and the edge of the second shield 112 far away from the fourth lateral plate 124 is provided with the ornament rim 128 used to block the outside the push-pull mouth 127. When the second shield 112 is pushed to abut against the second lateral plate 122, the first snaps 160a are snapped into the first snap holes 150a, one lateral surface (a rear surface of the ornament rim 128) of the ornament rim 128 far away from the second shield 112 is closely fitted with one lateral surface (a front surface of the fourth lateral plate 124) of the fourth lateral plate 124 far away from the first shield 111, so as to block the push-pull mouth 127. The fixation and installation of the second shield 112 is completed, and the installation of the plastic housing 110 is completed, as illustrated in FIG. 10.

S5 illustrates a schematic view of the assembled box fan 1.

In one embodiment, the step S0 can be carried out in any step prior to the step S4, i.e., the step S0 may need to be carried out prior to the step S4. The drawings only illustrate the case in which the step S0 is carried out prior to the step S1, which is just for convenience of understanding, and should not be construed to limit the present disclosure.

In the specification, unless specified or limited otherwise, relative terms such as "top", "bottom", "front", "rear", "left", "right", "inner", "outer", "circumferential" as well as derivative thereof should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed there between. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A box fan comprising:
   a housing, the housing comprising two shields and a frame, the two shields being opposite to and spaced from each other, the frame being arranged between the two shields, the frame and the two shields being joined through their own structures without screws; and
   a fan blade rotatably arranged in the housing;
   wherein the two shields are a first shield and a second shield arranged opposite to each other, each of the first shield and the second shield is configured as a rectangle;
   wherein the frame comprises a first lateral plate, a second lateral plate, a third lateral plate and a fourth lateral plate which are connected one by one;
   wherein the first lateral plate and the third lateral plate are arranged opposite to each other and connected with two opposite edges of the first shield respectively, the second lateral plate and the fourth lateral plate are arranged opposite to each other and connected with the other two opposite edges of the first shield respectively;
   wherein the second shield is pushable and pullable relative to the frame and is connected with the first lateral plate, the second lateral plate and the third lateral plate.

2. The box fan according to claim 1, wherein each of the two shields and the frame is a plastic part.

3. The box fan according to claim 1, wherein at least one of the shields is connected with the frame through snap fit or plug-in connection.

4. The box fan according to claim 1, wherein two adjacent lateral plates are connected with each other through snap fit or plug-in connection.

5. The box fan according to claim 1, wherein each of the first lateral plate, the second lateral plate, the third lateral plate and the fourth lateral plate defines a limiting groove, each of four edges of the first shield is fitted in the limiting groove through a plug-in connection.

6. The box fan according to claim 5, wherein the limiting groove in each of the first lateral plate and the third lateral plate is a wedge-shaped groove, the wedge-shaped groove has a width increasing gradually in a direction from the second lateral plate to the fourth lateral plate.

7. The box fan according to claim 1, wherein two adjacent lateral plates among the first lateral plate, the second lateral plate, the third lateral plate and the fourth lateral plate are fitted through plug-in connection between an insertion and an insertion groove.

8. The box fan according to claim 1, wherein each of the first lateral plate, the second lateral plate and the third lateral plate defines a push-pull groove, and the second shield is pushably and pullably fitted with the push-pull groove.

9. The box fan according to claim 8, wherein the push-pull groove in each of the first lateral plate and the third lateral plate is a wedge-shaped groove, the wedge-shaped groove has a width increasing gradually in the direction from the second lateral plate to the fourth lateral plate.

10. The box fan according to claim 1, wherein a lateral surface of the third lateral plate far away from the first shield and a lateral surface of the first lateral plate far away from the first shield are both higher than a lateral surface of the fourth lateral plate far away from the first shield, a push-pull mouth is defined by the lateral surface of the fourth lateral plate, the first lateral plate and the third lateral plate, and the push-pull mouth is fitted with one of edges of the second shield.

11. The box fan according to claim 1, wherein each of the first lateral plate and the third lateral plate is a flat plate, and each of the second lateral plate and the fourth lateral plate is a U-shaped plate.

\* \* \* \* \*